(12) United States Patent
Juang et al.

(10) Patent No.: US 9,411,396 B2
(45) Date of Patent: Aug. 9, 2016

(54) ADAPTIVE DATA COLLECTION PRACTICES IN A MULTI-PROCESSOR DEVICE

(71) Applicant: Apple Inc., Cupertino, CA (US)

(72) Inventors: Ben-Heng Juang, Milpitas, CA (US); Arjuna Sivasithambaresan, Santa Clara, CA (US); Jesus A Gutierrez Gomez, Cupertino, CA (US); Karthik Anantharaman, Sunnyvale, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 357 days.

(21) Appl. No.: 14/137,288

(22) Filed: Dec. 20, 2013

(65) Prior Publication Data

US 2014/0181471 A1    Jun. 26, 2014

Related U.S. Application Data (60) Provisional application No. 61/740,504, filed on Dec. 21, 2012.

(51) Int. Cl.
| | | |
|---|---|---|
| *G06F 15/00* | (2006.01) | |
| *G06F 15/76* | (2006.01) | |
| *G06F 1/32* | (2006.01) | |
| *G06F 11/30* | (2006.01) | |

(52) U.S. Cl.
CPC .......... *G06F 1/3206* (2013.01); *G06F 11/3024* (2013.01); *G06F 11/3062* (2013.01)

(58) Field of Classification Search
CPC   G06F 1/3206; G06F 11/3062; G06F 11/3024
USPC ...................................................... 712/30–31
See application file for complete search history.

(56) References Cited

U.S. PATENT DOCUMENTS

| | | |
|---|---|---|
| 6,748,548 B2 | 6/2004 | Bormann et al. |
| 8,285,345 B2 | 10/2012 | He et al. |
| 2011/0264941 A1 | 10/2011 | Park et al. |
| 2012/0246505 A1 | 9/2012 | Ma et al. |
| 2014/0208070 A1* | 7/2014 | Alley ................... G06F 9/3877 712/31 |

* cited by examiner

*Primary Examiner* — Chun-Kuan Lee
(74) *Attorney, Agent, or Firm* — Meyertons Hood Kivlin Kowert & Goetzel, P.C.; Jeffrey C. Hood; Joel L. Stevens (57) ABSTRACT

Adaptive data collection practices in a multi-processor device. The device may include a first processor and a second processor. The first processor may operate in any of a plurality of power states. The first processor may indicate to the second processor when it transitions to a different power state. The second processor may collect information relating to its operation. The second processor may collect the information according to different information collecting modes depending on in which power state the first processor is operating. Less information may be collected in an information collecting mode corresponding to a lower power state of the first processor than in an information collecting mode corresponding to a higher power state of the first processor.

19 Claims, 5 Drawing Sheets

ADAPTIVE DATA COLLECTION PRACTICES IN A MULTI-PROCESSOR DEVICE

PRIORITY CLAIM

The present application claims benefit of priority to U.S. Provisional Application No. 61/740,504 titled "Adaptive Data Collection Practices in a Multi-Processor Device" and filed on Dec. 21, 2012, whose inventors are Ben-Heng Juang, Arjuna Sivasithambaresan, and Jesus A Gutierrez Gomez, which is hereby incorporated by reference in its entirety as though fully and completely set forth herein.

FIELD

The present disclosure relates to electronic devices, and more particularly to a system and method for adaptive data collection practices in a multi-processor device.

DESCRIPTION OF THE RELATED ART

Electronic devices are ubiquitous, and are used for numerous purposes, including business, entertainment, communication, manufacturing, convenience, and numerous other purposes. The rapidly increasing variety of functions and form factors of electronic devices has led to the use of multiple processors in many devices. For example, in some cases multiple similar processors may be deployed to provide general parallel processing capability, while in other cases multiple different (e.g., specialized) processors may be deployed to perform specific functions within a device. Depending on a device's architecture, processors may share a power domain or may be deployed on separate power domains.

It is sometimes the case that in a multi-processor system, a processor (e.g., a slave processor) will collect information relating to its operation and provide that information to another processor (e.g., a master processor) in the device. It may be common in such a case for the slave processor to provide an indication to the master processor when sufficient data has been collected, based on which the master processor may retrieve the data.

If the processors are deployed in separate power domains, it is possible that the slave processor may be actively operating and collecting information relating to its operation while the master processor is in a low power state. In this case, indications from the slave processor to the master processor may interrupt the low power operation of the master processor and force the master processor to 'wake-up' and enter a more active state in which more power is consumed. This can have a negative effect on overall power consumption (and thus battery life, for battery-powered devices). Accordingly, improvements in the field would be desirable.

SUMMARY

In light of the foregoing and other concerns, it would be desirable to provide a way for information-collecting processors in a multi-processor device to implement adaptive information collecting practices. In particular, it would be desirable to provide a way for a processor of a device to adapt its information collecting practices based on considerations relating to other processor(s) in the device, such as activity level of the other processor(s). For example, a processor might collect more types of information and/or collect information more frequently if a co-processor to which the data will be provided is in an active power state, but might collect fewer types of information and/or collect information less frequently if a co-processor to which the data will be provided is in a low-power state.

Consider, as one example, the case of a wireless user equipment (UE) device configured for wireless communication. Consider, in particular, a UE which includes an application processor (which may be a master processor for the UE) and a baseband processor (which may be a slave processor). The UE's operating system and application layer functionality may be implemented by the application processor, while wireless communication functionality (e.g., control of a radio) may be primarily supported by the baseband processor. Further consider that each processor may operate in a different power domain. In other words, each processor may be able to transition between power states (e.g., an "active" state and a "low-power" or "sleeping" state, among various possible states) independently of the other processor.

It may generally be desirable in such a scenario for the baseband processor to collect certain information relating to its operation and provide that information to the application processor. For example, the application processor might be provided with baseband statistic information (e.g., processor use statistics) in order to gain understanding of the behavior of the baseband processor, as well as tracing information, e.g., for debugging purposes. Since the baseband processor and the application processor may each operate on their own power domain, the baseband processor may store the collected information in a local buffer, and occasionally (e.g., when the local buffer is full or nearly full) indicate to the application processor to retrieve the collected information.

Since the baseband and application processors may be operating in independent power domains in such a scenario, it is possible that the baseband processor might be actively operating and collecting information relating to its operation (e.g., processor use statistics, tracing information) while the application processor is in a low power state. If the baseband processor were to perform "normal" information collecting practices, the collected information would likely rapidly fill the local buffer and require frequent indications to the application processor to retrieve (and potentially process) the collected information. This may interrupt the low-power operation of the application processor, which may deplete power reserves of the UE (e.g., if the UE is a battery powered device). Accordingly, it would be desirable in this particular scenario for the baseband processor to modify its information collecting practices (e.g., by reducing the amount of information collected) when the application processor is in a low-power state, in order to reduce the frequency with which the application processor must wakeup and retrieve the collected information from the baseband processor's local buffer. The baseband processor might later return to its "normal" (e.g., more verbose) information collecting practices when the application processor is in an active state.

It will be readily recognized that while the above-provided example of a UE having an application processor and a baseband processor represents one possible scenario in which adaptive information collecting practices may be desirable, numerous other possible scenarios (including variations on the above-provided scenario) in which adaptive information collecting practices in a multi-processor device may be desirable are also possible.

Accordingly, embodiments are presented herein of a method for adaptive information collection practices in a device, and a device configured to implement the method. The device may have at least two processing elements. For example, the device may be a UE, including an application processor and one or more radios (each having a baseband processor and/or one or more antennas). In addition, the device may include a non-transitory computer accessible memory medium, which may store program instructions executable by the device to implement part or all of the method.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
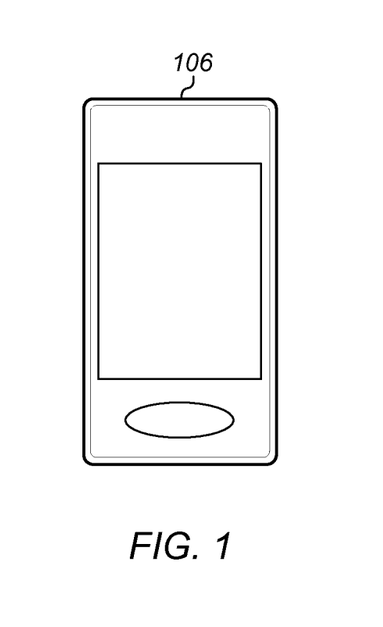
FIG. 1 illustrates an exemplary multi-processor device.
Figure 2:
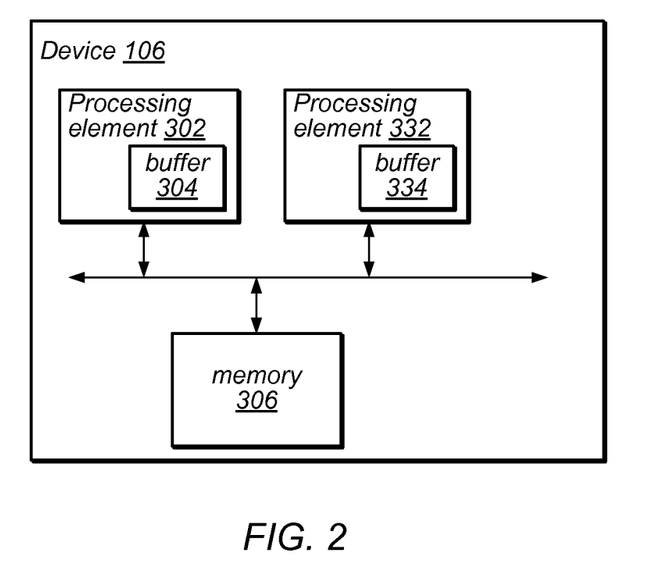
FIG. 2 illustrates an exemplary block diagram of a multi-processor device.

FIGS. 1-2—Multi-Processor Device

FIG. 1 illustrates an exemplary electronic device 106 which may be configured for use in conjunction with various aspects of the present disclosure. The device 106 may be any of a variety of types of device and may be configured to perform any of a variety of types of functionality. As shown, the device 106 may be a substantially portable device (a mobile device), such as a mobile phone, a personal productivity device, a computer or a tablet, a handheld gaming console, a portable media player, etc. Alternatively, the device 106 may be a substantially stationary device, if desired.

FIG. 2 is an exemplary (and simplified) block diagram of the device 106. As shown, the device 106 may include multiple processing elements (processing element 302 and processing element 332). Each processing element may include or be coupled to one or more local memory elements (e.g., caches or buffers, such as buffer 304 for processing element 302 and buffer 334 for processing element 332). Processing elements 302 and 332 may be implemented on discrete power domains; for example, processing elements 302 and 332 may be provided as part of two discrete integrated circuits (chips) in the device 106, which may be capable of transitioning between various operating (power/activity level) states separately from each other.

As shown, the device 106 may also include one or more additional memory media (e.g., memory 306), which may include any of a variety of types of memory and may serve any of a variety of functions. For example, memory 306 could be RAM serving as a shared system memory for processing elements 302 and 332. Other types and functions are also possible. The device 106 may additionally include any of a variety of other components (not shown) for implementing device functionality, depending on the intended functionality of the device 106, which may include further processing and/or memory elements, one or more power supply elements (which may rely on battery power and/or an external power source) user interface elements (e.g., display, speaker, microphone, camera, keyboard, mouse, touchscreen, etc.), communication elements (e.g., antenna for wireless communication, I/O ports for wired communication, communication circuitry/controllers, etc.) and/or any of various other components.

The components of the device 106, such as processing element 302, processing element 332, and memory 306, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing element 302 and processing element 332. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 302, processing element 332, memory 306, and/or any of various other device components. Other types of interfaces (e.g., intra-chip interfaces for communication within processing element 302 or processing element 332, peripheral interfaces for communication with peripheral components within or external to device 106, etc.) may also be provided as part of device 106.

Figure 6:
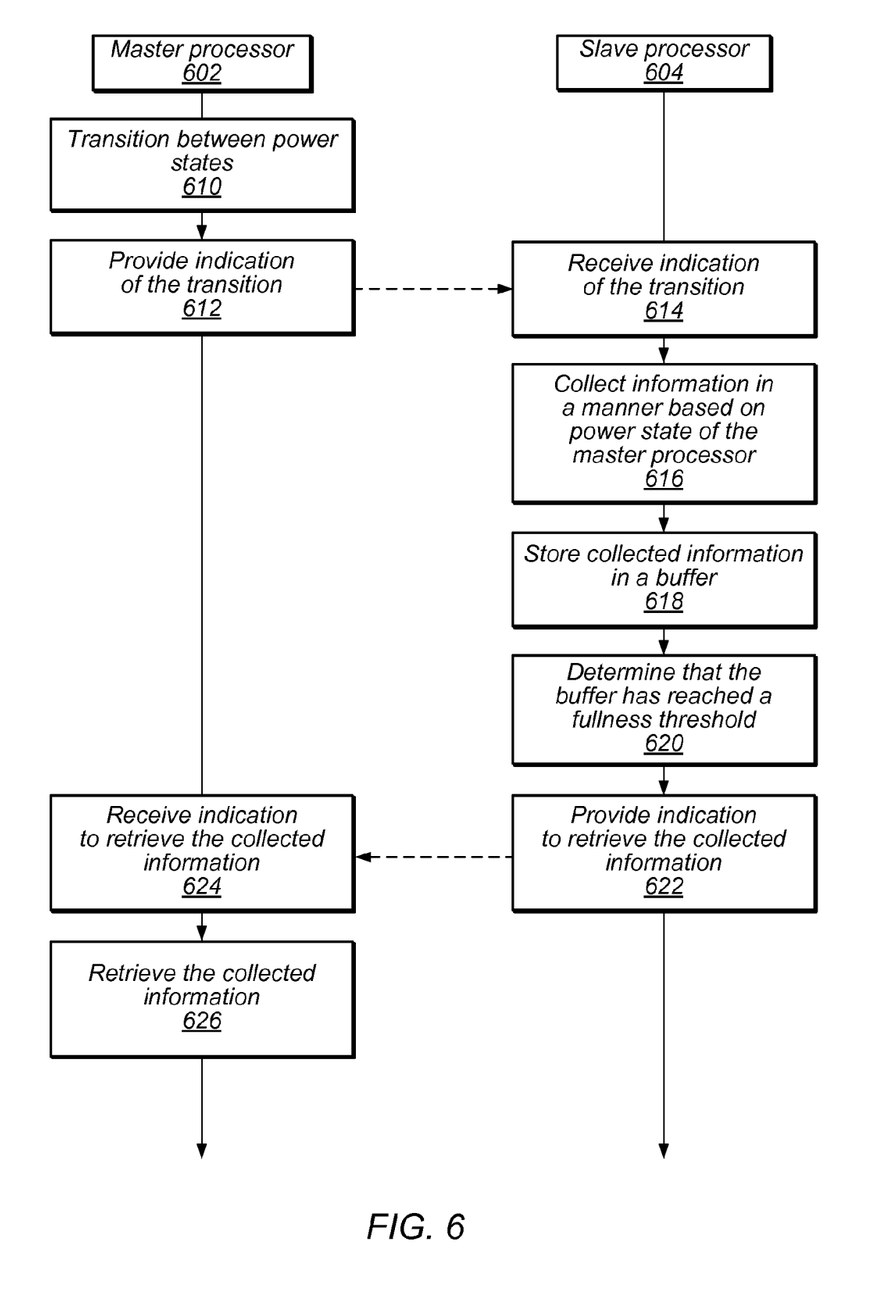
FIG. 6 is a flowchart diagram illustrating an exemplary method for adaptive information collecting by a slave processor based on a power state of a master processor in a multi-processor device.

As described herein, the device 106 may include hardware and software components for implementing features for adapting data collection practices of one processor based on a power state of another processor, such as those described herein with reference to, inter alia, FIG. 6.

Figure 3:
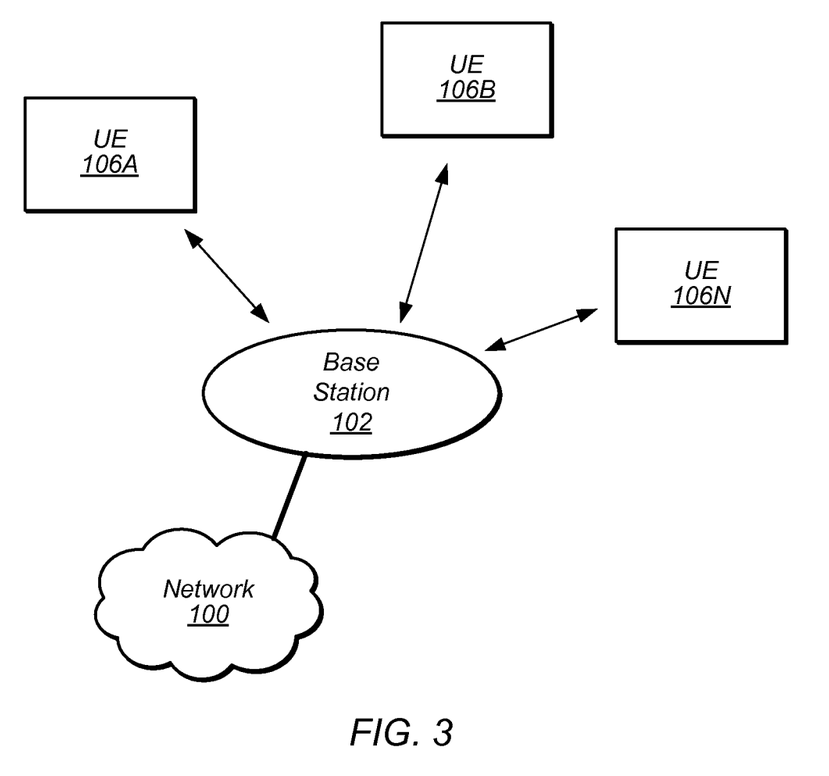
FIG. 3 illustrates an exemplary (and simplified) wireless communication system.

FIG. 3—Wireless Communication System

FIG. 3 illustrates an exemplary (and simplified) wireless communication system. It is noted that the system of FIG. 3 is merely one example of a possible system, and any of a variety of alternative wireless communication systems are also possible. The wireless communication system of FIG. 3 is provided by way of example of one possible system in which a device 106 which implements features for adapting data collection practices of one processor based on a power state of another processor might be advantageously deployed. It will be recognized by those of skill in the art, however, that a device 106 which implements features for adapting data collection practices of one processor based on a power state of another processor such as described herein may additionally or alternatively be advantageously deployed in any number of other types of systems.

As shown, the exemplary wireless communication system includes a base station 102 which communicates over a transmission medium with one or more devices 106A, 106B, etc., through 106N. The devices 106A-N used for wireless communication in the wireless communication system of FIG. 3 may be implementations of the electronic device 106 shown in and described with respect to FIGS. 1-2. In their exemplary implementation in the wireless communication system of FIG. 3, each of the devices 106A-N may be referred to herein as a wireless "user equipment" device or simply "UE" 106.

The base station 102 may be an access point providing a wireless local area network (WLAN). The access point may be equipped to communicate with a network 100 (e.g., a wide area network (WAN), such as the Internet, among various possibilities). Thus, the access point may facilitate communication between the UEs 106 and/or between the UEs 106 and the network 100. This in this case the base station 102 and the UEs 106 may be configured to communicate over the transmission medium using Wi-Fi, including any of various versions of IEEE 802.11 (e.g., a, b, g, n, ac, etc.).

As another possibility, base station 102 may be a base transceiver station (BTS) or cell site (a "cellular base station"), and may include hardware that enables wireless communication with UEs 106 according to one or more cellular communication protocols. Thus in this case, the UE 106 and the base station 102 may communicate using any of various cellular communication technologies such as GSM, UMTS (WCDMA), LTE, LTE-Advanced (LTE-A), 3GPP2 CDMA2000 (e.g., 1×RTT, 1×EV-DO, HRPD, eHRPD), etc.

In this case as well, the base station 102 may be equipped to communicate with a network 100 (e.g., a core network of a cellular service provider, a telecommunication network such as a public switched telephone network (PSTN), and/or the Internet, among various possibilities). Thus, the base station 102 may facilitate communication between the UEs 106 and/or between the UEs 106 and the network 100. In particular, the base station 102 may provide UEs 106 with various telecommunication capabilities, such as voice and SMS services and/or data services.

Note that a UE 106 may be capable of communicating using multiple wireless communication standards. For example, the UE 106 may be configured to communicate using Bluetooth, Wi-Fi, any of various cellular communication protocols (e.g., GSM, UMTS (WCDMA), LTE, LTE-Advanced (LTE-A), 3GPP2 CDMA2000 (e.g., 1×RTT, 1×EV-DO, HRPD, eHRPD), etc.), one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 4:
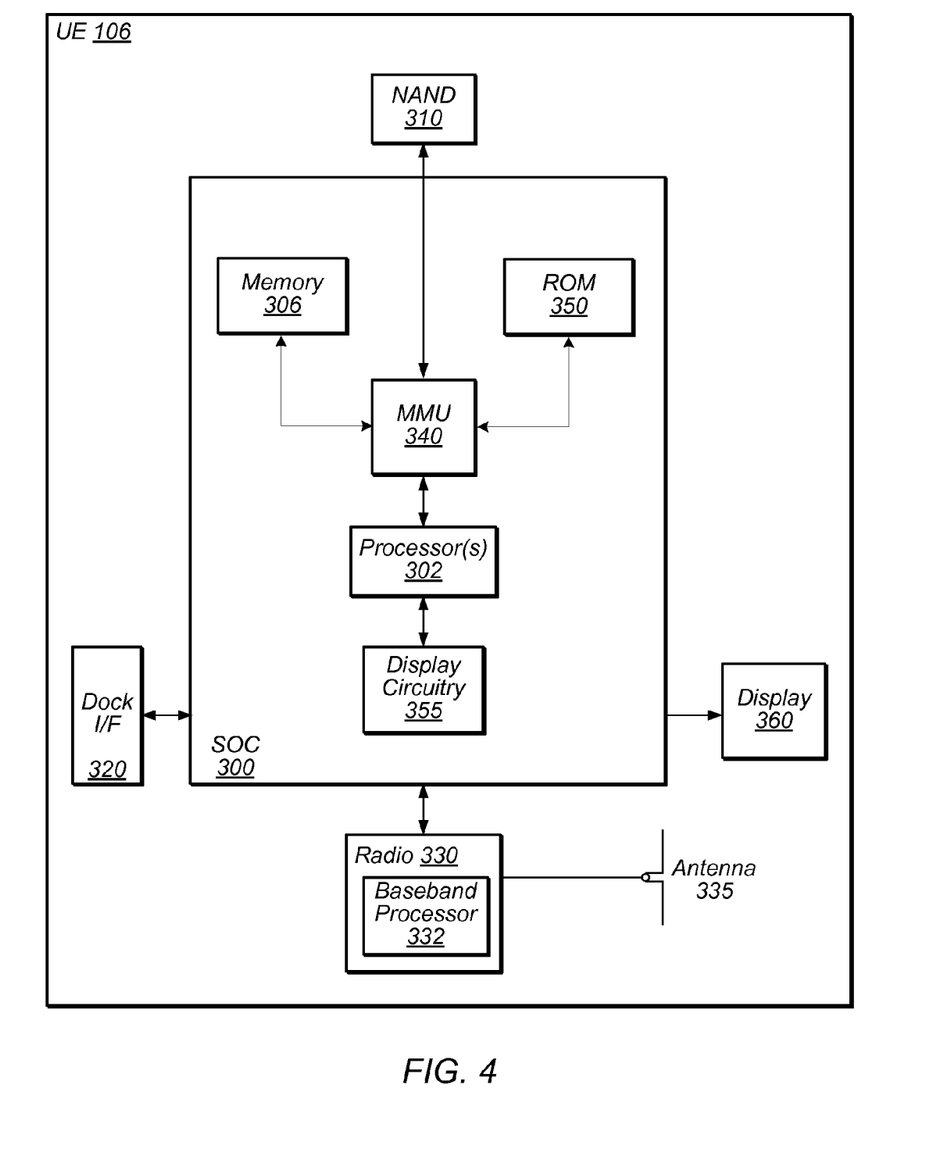
FIG. 4 illustrates an exemplary block diagram of a UE.

FIG. 4—Exemplary Block Diagram of a UE

FIG. 4 is an exemplary block diagram illustrating further details of one possible implementation of the device 106 illustrated in FIGS. 1-2. The device 106 illustrated in FIG. 4 may also be suitable for use as a UE such as those illustrated in FIG. 3, and thus may also be referred to as UE 106.

As shown, the UE 106 may include a system on chip (SOC) 300, which may include portions for various purposes. For example, as shown, the SOC 300 may include processor(s) 302 which may execute program instructions for the UE 106 and display circuitry 355 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 355, wireless communication circuitry 330 (also referred to as a "radio"), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and radio 330 (e.g., for LTE, LTE-A, CDMA2000, Bluetooth, Wi-Fi, GPS, etc.).

As shown, the radio 330 may be implemented in the UE 106 as an integrated circuit (chip) which is discrete from the SoC 300 on which the processor 302 (e.g., an application processor) may reside. The radio 330 may include its own baseband processor 332, which may support wireless communication according to one or more wireless communication protocols/radio access technologies. Note also that while UE 106 is illustrated as having a single radio 330, the UE 106 may alternatively have multiple radios (e.g., for implementing multiple wireless communication technologies), which may each have one or more baseband processors if desired. The UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 106 may include hardware and software components for implementing features for adapting data collection practices of one processor based on a power state of another processor, such as those described herein with reference to, inter alia, FIG. 6. The processing elements 302 and 332 of the UE device 106 may be configured to implement part or all of the features described herein, e.g., by executing program instructions stored on a memory medium (e.g., a non-transitory computer-readable memory medium). Alternatively (or in addition), one or both of processors 302 and 332 may be configured as a programmable hardware element, such as an FPGA (Field Programmable Gate Array), or as an ASIC (Application Specific Integrated Circuit). Alternatively (or in addition) the processing elements 302 and 332 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 5:
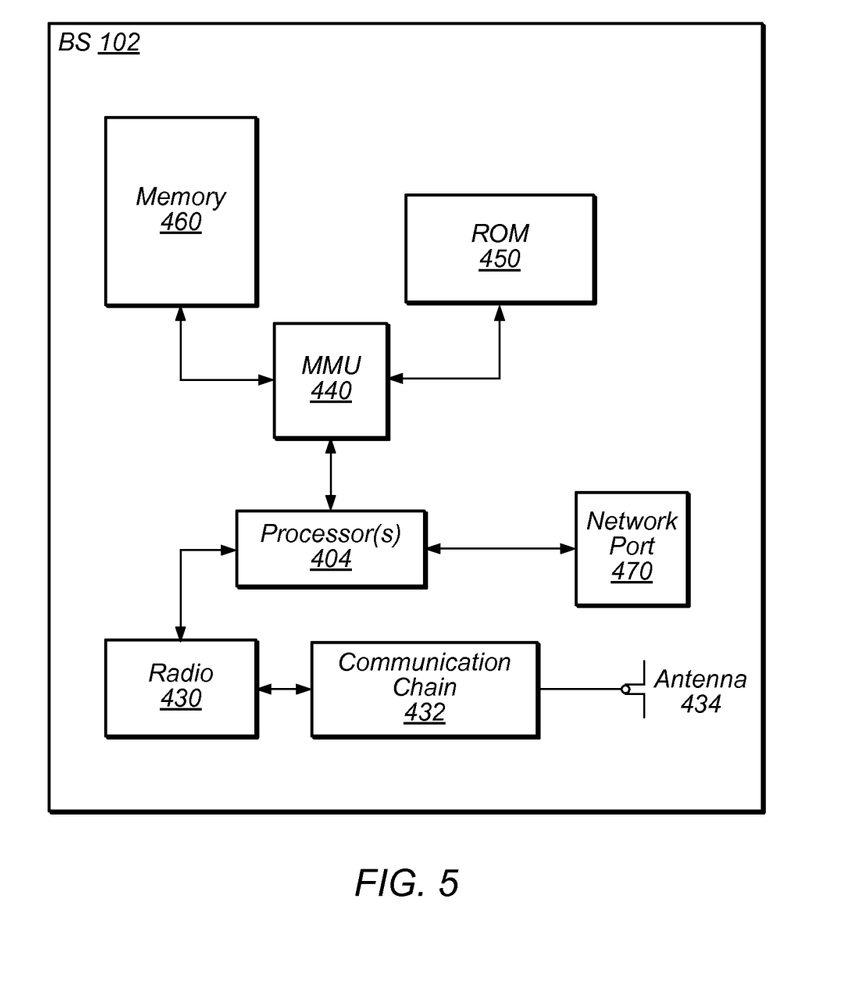
FIG. 5 illustrates an exemplary block diagram of a base station.

FIG. 5—Exemplary Block Diagram of a Base Station

FIG. 5 illustrates an exemplary block diagram of a base station (BS) 102, such as BS 102 illustrated in FIG. 3. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network (e.g., a public switched telephone network (PSTN)) and provide a plurality of devices, such as UE devices 106, access to the telephone network.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The base station 102 may be configured for use in conjunction with a UE 106 (e.g., as illustrated in FIG. 3), which may in turn be configured to implement features for adapting data collection practices of one processor based on a power state of another processor. Alternatively, or in addition, the base station 102 may itself be configured to implement features for adapting data collection practices of one processor based on a power state of another processor. For example, the processor(s) 404 may interact with a baseband processor included with the radio 430 (and/or any other elements of base station 102) according to the features described herein with reference to, inter alia, FIG. 6.

FIG. 6—Flowchart

For many electronic devices, it is typical to include multiple processing elements. One processing element may assume a role as master and any other processing elements may assume roles as slaves. In this case, the master processor may collect various information from the slave processor(s) in order to maintain and/or improve performance of the device. For example, statistic information for any slave processors (e.g., processor use statistics) may be collected in order to support the master processor's understanding of the behavior of the slave processor(s), which may in turn facilitate efficient operation of the device. As another example, tracing information (e.g., relating to specific operations undertaken by the slave processor(s)) may be collected in order to support any necessary debugging operations by the master processor and/or the slave processor(s).

Furthermore, in many cases the slave processor(s) may operate on their own power domain, separate from the master processor. In such cases, some means of inter-processor communication, e.g., for transferring the collected information from the slave processor(s) to the master processor, may be provided. For instance, a slave processor might collect information according to its information collecting configuration and store the collected information in its own local buffer. Once the local buffer has been filled, or reached a certain fullness threshold, the slave processor might indicate to the master processor to retrieve the collected information from the local buffer. The master processor might then retrieve the collected information, and possibly process or otherwise make use of the retrieved information, according to its configuration. Other information transferring mechanisms may alternatively or additionally be provided if desired.

A challenge that may arise in such cases relates to how to provide for such information collection and transfer between processors in a manner which has minimal impact on the device's normal behavior and power consumption. For example, if the local buffer were to reach its pre-determined fullness threshold while the master processor is in the reduced-power state, an indication to retrieve the buffered data may interrupt its reduced-power state and force it to "wake-up" (i.e., transition to a higher-power state), increasing its power consumption and generally impacting the device's normal behavior. Furthermore, since the processors may operate in separate (e.g., independent) power domains, it may be possible for a slave processor to be in active operation while the master processor is in a reduced-power state; if the slave processor were to collect a significant amount of information in such a state of affairs, the frequency at which the master processor may be required to wakeup to retrieve information collected by the slave processor might be undesirably high.

Accordingly, certain embodiments of the present disclosure relate to a method for a multi-processor device to adapt its information collection practices in various situations. FIG. 6 is a flowchart diagram illustrating such a method. The method shown in FIG. 6 may be used in conjunction with any of the computer systems or devices shown in the above Figures, among other devices. Some of the method elements shown may be performed concurrently, in a different order than shown, or may be omitted. Additional method elements may also be performed as desired.

FIG. 6 relates, in particular, to a method for a slave processor 604 in a multi-processor device to modify its information collecting practices based on a power-state of a master processor 602 in the multi-processor device, and for the master processor 602 to facilitate the adaptive information collecting practices of the slave processor 604. As noted above, the multi-processor device may be any of a variety of devices. A common example might include a smart phone or other device configured for wireless communication (e.g., according to one or more cellular communication protocols such as UMTS, LTE, and/or CDMA2000, and/or according to one or more other cellular communication protocols such as Wi-Fi, Bluetooth, near-field communication (NFC), etc), and which is configured to execute a mobile operating system such as iOS™ or Android™. Such devices may commonly include one or more application processors (e.g., for supporting application layer functionality) and one or more baseband processors (e.g., for supporting wireless communication). The device may alternatively be any of a variety of other types of device (which may or may not include wireless communication capabilities) which includes multiple processing elements, as desired, including but not limited to tablet computers, e-readers, portable multimedia players, portable gaming systems, etc. Alternatively or additionally, the device may be the device 106 described hereinabove in detail with reference to FIGS. 1-2, and/or more particularly may be the UE device 106 described hereinabove in detail with reference to FIG. 4. As shown, the method may operate as follows.

In 610, the master processor may transition between power states. The master processor 602 may be capable of operating in any of multiple (e.g., at least two) power states. For example, the master processor 602 may be capable of operating in an active (higher power) state, e.g., in which the master processor 602 executes various program instructions, performs various tasks, etc., or in a lower power ("low power" or "sleeping") state, e.g., in which the master processor 602 may be limited in its capability of performing various functions and part or all of the elements of the master processor 602 may use limited or no power. The master processor 602 may additionally or alternatively be configured to operate in one or more other power states, if desired.

In 612, the master processor 602 may provide an indication of the transition to the slave processor 604. Note that the indication of the transition may be provided before or after (or at the same time as) the transition itself; the relative timing may depend on the type of transition, in some instances. For example, if the transition is from an active state to a reduced- or low-power state, the indication may be provided before the transition (e.g., while still in the active state), while if the transition is to an active state from a reduced- or low-power state, the indication may be provided after the transition (e.g., once in the active state).

The indication may identify the nature of the transition; for example, the indication may identify that the power state from which the master processor 602 is transitioning, and may identify the power state into which the master processor is transitioning. This may be helpful, for example, if the master processor 602 is configured to operate in any one of more than two possible power states. Alternatively, the indication may simply identify that a transition has occurred; for example, if the master processor 602 is configured to operate in one of only two possible power states, the slave processor 604 may be able to track in which of the two power states the master processor is operating at any given time, so a simple indication that a transition has occurred may be sufficient for the slave processor 604 to determine (and record) into which power state the master processor 602 has transitioned.

Alternatively, if desired, an indication may be provided from the master processor 602 to the slave processor 604 which commands the slave processor to switch to a different information collecting mode. The indication may or may not specify that the command to switch information collecting modes may be based on a transition between power states of the master processor 602, as desired, depending on the implementation. Furthermore, if desired, the master processor 602 may provide an indication to switch to a different information collecting mode to the slave processor 604 for any of a variety of reasons, including reasons other than transitions between power states of the master processor 602.

In 614, the slave processor 604 may receive the indication of the transition from the master processor 602. The slave processor 604 may accordingly determine in which power state the master processor 602 is operating. Based on this, the slave processor 604 may determine in which of multiple possible information collecting modes to operate. For example, the slave processor 604 may be configured to collect information relating to its operation according to one (a "first") information collecting mode when the master processor is operating in an active state, and may be configured to collect such information according to another (a "second") information collecting mode when the master processor is operating in a low power state. Any number of other information collecting modes may also or alternatively be defined.

In 616, the slave processor 604 may collect (log) information relating to its operation in a manner based on the power state of the master processor 602. In particular, the slave processor 604 may collect information relating to its operation according to a determined information collecting mode. The different possible information collecting modes may specify collection of different types and/or amounts of information. For example, the first information collecting mode, which as noted above may be designed for implementation during active operation of the master processor 602, may be more verbose than the second information collecting mode, which as noted above may be designed for implementation during low power operation of the master processor 602.

As a more detailed example, consider that the slave processor 604 may be configured to log statistic and tracing information for the slave processor 604. For example, the slave processor may be a baseband processor of a wireless user equipment (UE) device, and may report statistics and tracing information relating to baseband operations (e.g., establishing wireless links for voice and/or data communications and performing voice and/or data communications via those wireless links) to an application processor of the UE, which may act as the master processor of the UE. In this case, the baseband processor might log statistic and tracing information according to a first information collecting mode (or "log mask", or "logging configuration mode") if the application processor is active. The first information collecting mode/log mask might be quite verbose, and might specify that tracing information for all (or many) types of baseband operations may be recorded and reported. If the application processor is sleeping, however, the baseband processor might log statistic and tracing information according to a second information collecting mode/log mask. The second information collecting mode/log mask might be less verbose, and might specify that tracing information for only some (e.g., fewer) types of baseband operations may be recorded and reported.

As one possibility, the first information collecting mode might specify a higher level of trace/debug information capture than the second information collecting mode, in particular in relation to over-the-air signaling, device internal states, state transitions, and/or inter-module/component communications. For example, according to one possible first log mask, information might be collected for monitoring network conditions (e.g., serving and/or neighboring cell RSRP and RSRQ measurements, etc.), receiving and decoding paging messages, signaling relating to RRC connection attempts/RACH attempts (successes and/or failures), forward and reverse link statistics (e.g., packet drop rates and/or packet success rates), and/or a variety of other operations undertaken by the slave processor 604. In contrast, according to an exemplary possible second log mask, information might be collected only for monitoring network conditions and receiving and decoding paging messages, but not for signaling relating to RRC connection attempts/RACH attempts, forward or reverse link stats, or any other operations.

Alternatively, any number of other information collecting mode/log masks (e.g., with different amounts and/or types of information logged) may be implemented for various power states of the application processor, or more generally, of the master processor 602.

Furthermore, as previously noted, in some instances there may be more than two information collecting modes/log masks, and information collecting modes/log masks may be defined for other reasons than (i.e., additionally or as alternatives to) power states of the master processor 602. For example, in certain scenarios an intermediate log mask, according to which more information is collected than according to the second log mask, but less information is collected than according to the first log mask, may be useful. An exemplary such scenario might be a situation in which the slave processor 604 has encountered a problem (e.g., losing a network connection and experiencing out-of-service (OOS) conditions for an extended period of time, as one possibility) while the master processor 602 is in a low power state. In case of such a scenario, one or more 'debugging' log masks (e.g., which may be targeted to specific types of problems, or may be generic to multiple types of problems) might be defined and used.

In 618, the slave processor 604 may store the collected information in a buffer. The buffer may be a local buffer of the slave processor 604. Alternatively, the buffer may be a shared memory accessible to both the slave processor 604 and the master processor 602. The slave processor 604 may fill the buffer with the collected information until the buffer is filled, or alternatively, until the buffer reaches a certain (e.g., predetermined) fullness threshold. Note that since less information may be collected in the second information collecting mode than in the first information collecting mode, the amount of time to fill the buffer may be greater in the second information collecting mode than in the first information collecting mode.

In 620, the slave processor 604 may determine that the buffer has reached the fullness threshold. Once the buffer has reached the fullness threshold, in order to prevent buffer overflow, it may be desirable for the collected information stored in the buffer to be transferred to the master processor 602.

Accordingly, in 622, the slave processor 604 may provide an indication to retrieve the collected information to the master processor 602. Alternatively, depending on the configuration of the device implementing the method, the slave processor 604 may transfer (push) the collected information to the master processor 602 (e.g., to a local buffer of the master processor 602, or to a shared memory accessible to the master processor 602). The slave processor 604 may still provide an indication that the collected information is available to the master processor 602 in this case, if desired, e.g., in order to facilitate the master processor 602 processing and acting on the collected information (which may, for example, be necessary in order to avoid future buffer overflow, e.g., as a result of a subsequent push, at the master processor 602).

In 624, the master processor 602 may receive the indication. If the master processor 602 is in a reduced- or low-power state when the indication is received, the master processor may transition to an active state based on the indication.

Based on the indication, in 626 the master processor 602 may retrieve (transfer from the buffer) the collected information, and store (e.g., in a local buffer of the master processor 602) and/or possibly process and act on (e.g., depending on its configuration) the collected information. If the master processor 602 transitioned to the active state specifically as a result of the indication, the master processor may subsequently return to the reduced power state. Indications of such (e.g., information retrieval induced) transitions may or may not be provided to the slave processor 604, as desired. For example, if the master processor 602 briefly transitions from a reduced-power state to an active state to retrieve information collected by the slave processor, then transitions back to the reduced-power state afterwards, it may be preferable not to provide indications of such transitions to the slave processor 604, in order to prevent the slave processor 604 from rapidly transitioning into and out of different information collecting modes.

Note that part or all of the method of FIG. 6 may be repeated any number of times, as desired. For example, the master processor 602 might transition to a low power state and provide an indication thereof to the slave processor 604, which might in turn select an appropriate (e.g., less verbose) information collecting mode and collect information relating to its operations accordingly, for a period of time. Subsequently, the master processor 602 might transition to an active state and provide an indication thereof to the slave processor 604, which might in turn select an appropriate (e.g., more verbose) information collecting mode and collect information relating to its operations accordingly, for a further period of time. Any number of further transitions between power states of the master processor, and resulting transitions between information collecting modes of the slave processor, may be performed, with the master processor 602 retrieving information collected by the slave processor 604 and stored in the buffer on any number of occasions during and/or between those transitions.

Note further that if desired, the slave processor 604 may also be configured to transition between various information collecting modes/log masks based on internal conditions/states. For example, the slave processor 604 might also be configured to operate in any of multiple power states (such as a low-power/sleep state and an active state), and might be configured to transition between them separately from (possibly independently, or possibly partially dependent on) the master processor 602. Referring back to the exemplary case of a UE implemented with an application processor and a baseband processor, the baseband processor might transition between "active" and "sleeping" states based on discontinuous reception (DRX) cycle timing of a radio access network (RAN) in an idle- or connected-mode independently of whether the application processor is in a low-power (sleeping) state or an active state. As another possibility, the baseband processor might be powered down while the application processor is active if the UE is being used to play a game in airplane mode (e.g., on an airplane). Thus, the slave processor 604 could transition between and collect information according to different information collecting modes/log masks based on its own current power state in addition or as an alternative to transitioning between different information collecting modes/log masks based on a current power state of the master processor 602.

Furthermore, note that although the method of FIG. 6 is described primarily as being implemented between two processors (e.g., a master processor 602 and a slave processor 604) in a multi-processor device, the method may be extended to apply to any number of additional processors. For example, a device might have multiple slave processors, each of which (or a subset of which) might adapt their information collecting practices based on a power state in which the master processor 602 is currently operating (or more generally, based on indications received from the master processor).

Implementing adaptive information collecting practices at the slave processor 604 based on a current power state of the master processor 602, such as described hereinabove with respect to the method of FIG. 6, may provide a desirable balance with respect to information collection. In particular, the method of FIG. 6 may advantageously provide for collecting more information in situations when it may most significantly improve device performance and collecting less information in situations when it may reduce power consumption.

For example, consider again the exemplary case in which the device is a UE. When the application processor is actively providing application layer functionality, for instance if a user of the UE is browsing a website, checking email, or otherwise actively using application layer functionality of the UE which relies on wireless communication, the application processor may request and use more intensive information to understand the behavior and performance of the baseband processor, which may in turn beneficially affect applications with which the user may be interacting. In this case, more verbose/extensive information collecting practices may be desirable. However, when the device is idle, and the application processor is in a low power state, the application processor may request less information from the baseband processor, in order to avoid being woken overly frequently, which might increase power consumption and reduce battery life of the UE.

Similar considerations may apply more generally, e.g., in implementations other than when the device is a UE, the master processor is an application processor, and the slave processor is a baseband processor. For example, regardless of the particular function(s) of the master processor 602 and slave processor 604, since the slave processor 604 may collect less information when the master processor 602 is in a low power state, it may take longer for the buffer to reach the fullness threshold (an amount of time to fill the buffer may be increased) at these times than when the master processor 602 is in an active state. As a result, the slave processor 604 may provide indications to retrieve the collected information less frequently than when the master processor 602 is in the active state, and the low power state of the master processor 602 may be interrupted (e.g., to retrieve the collected information) less frequently than if the same information collecting practices were implemented as when the master processor 602 is in the active state, which may cause the master processor 602 to remain in the low power state for a greater amount of time before transitioning to the active state to retrieve the collected information. This may in turn advantageously reduce the power consumption of the master processor 602, and thereby reduce the power consumption of the device in which the master processor 602 is implemented.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, comprising:
   a first processor, wherein the first processor is an application processor configured to provide application layer functionality, and
   a second processor operatively coupled to the first processor, wherein the second processor is a baseband processor configured to provide wireless communication functionality, wherein the second processor is configured to collect information relating to its operation and store the collected information in a local buffer for transfer to the first processor,
   wherein the second processor is configured to collect the information relating to its operation according to a first information collecting mode when the first processor operates in an active state, wherein the second processor is configured to collect the information relating to its operation according to a second information collecting mode when the first processor operates in a low power state, wherein less information is collected in the second information collecting mode than in the first information collecting mode,
   wherein the first processor is configured to provide indications to the second processor when the first processor transitions between the active state and the low power state,
   wherein the second processor is configured to transition between the first information collecting mode and the second information collecting mode based on the indications.

2. The device of claim 1,
   wherein the second processor is configured to transfer the collected information from the local buffer to the first processor based on fullness of the local buffer,
   wherein collecting less information in the second information collecting mode than in the first information collecting mode increases an amount of time to fill the local buffer in the second information collecting mode relative to the first information collecting mode.

3. The device of claim 1,
   wherein the second processor is configured to provide an indication to retrieve the collected information to the first processor based on fullness of the local buffer,
   wherein the first processor is configured to retrieve the collected information based on the indication to retrieve the collected information.

4. The device of claim 1,
   wherein the second processor is further configured to transfer the collected information from the local buffer to the first processor based on fullness of the local buffer,
   wherein the second processor is further configured to provide indications to the first processor when the second processor transfers the collected information from the local buffer to the first processor based on fullness of the local buffer.

5. The device of claim 1,
   wherein the device further comprises one or more additional processors, wherein each of the additional processors is configured to collect information relating to its operation, store the collected information in a local buffer, and transfer the collected information from the local buffer to the first processor according to multiple information collecting modes based on a current power state of the first processor.

6. The device of claim 1,
   wherein the second processor is configured to operate in any of a plurality of power states independently of whether the first processor is operating in the active state or the low power state.

7. The device of claim 6,
   wherein the second processor is further configured to collect the information relating to its operation according to different information collecting modes based on a current power state of the second processor.

8. The device of claim 1,
   wherein the first information collecting mode specifies a higher level of trace and/or debug information capture than the second information collecting mode relating to one or more of:
   over-the-air signaling;
   device internal states;
   state transitions; and
   inter-module communications.

9. The device of claim 1,
   wherein according to the first information collecting mode, information is collected relating to:
   monitoring network conditions,
   receiving paging messages,
   radio resource control (RRC) connection signaling,
   forward link statistics, and
   reverse link statistics,
   wherein according to the second information collecting mode, information is collected relating to:
   monitoring network conditions, and
   receiving paging messages,
   wherein information relating to radio resource control (RRC) connection signaling, forward link statistics, and reverse link statistics is not collected according to the second information collecting mode.

10. The device of claim 1,
    wherein the first processor is a master processor of the device,
    wherein the second processor is a slave processor of the device.

11. A method for a slave processor in a multi-processor device to adapt its information collecting practices based on a power state of a master processor in the multi-processor device, the method comprising:
    receiving an indication that the master processor is operating in a first power state, wherein the first power state comprises an active state;
    collecting information relating to operation of the slave processor according to a first information collecting mode based on the indication that the master processor is operating in the first power state;
    receiving an indication that the master processor is operating in a second power state, wherein the second power state comprises a low-power state;
    collecting information relating to operation of the slave processor according to a second information collecting mode based on the indication that the master processor is operating in the second power state, wherein less information is collected in the second information collecting mode than in the first information collecting mode; and
    storing the collected information in a buffer.

12. The method of claim 11, the method further comprising:
    determining that the buffer has reached a predetermined fullness threshold;
    providing an indication to retrieve the collected information stored in the buffer to the master processor based on determining that the buffer has reached the predetermined fullness threshold, wherein the master processor is configured to retrieve the collected information stored in the buffer based on the indication.

13. The method of claim 11, the method further comprising:
    determining that the buffer has reached a predetermined fullness threshold;
    transferring the collected information stored in the buffer to the master processor based on determining that the buffer has reached the predetermined fullness threshold.

14. The method of claim 11,
    wherein the slave processor comprises a different power domain than the master processor, wherein the master processor is configured to operate in either of the first power state or the second power state independently of a power state of the slave processor.

15. The method of claim 11,
    wherein the buffer comprises a shared memory.

16. The method of claim 11,
    wherein the buffer is local to the slave processor.

17. A method for a master processor of a multi-processor device to facilitate adaptive information collecting practices for a slave processor of the multi-processor device based on a power state of the master processor, the method comprising:
    transitioning the master processor between at least two power states including an active state and a low power state;
    providing indications of transitions between the at least two power states to the slave processor, wherein the slave processor operates in a different power domain than the master processor, wherein the indications are configured to enable the slave processor to transition between at least two information collecting modes based on a current power state of the master processor including a first information collecting mode and a second information collecting mode, wherein the slave processor collects less information in the second information collecting mode during the low power state than in the first information collecting mode during the active state;
    receiving indications to retrieve information collected by the slave processor; and
    retrieving the information collected by the slave processor based on the indications to retrieve the information collected by the slave processor.

18. The method of claim 17,
    wherein the information collected by the slave processor comprises processor use statistics and tracing information for the slave processor.

19. The method of claim 17,
    wherein according to a first information collecting mode of the at least two information collecting modes, tracing information is collected for operations by the slave processor relating to:
        monitoring network conditions,
        receiving paging messages,
        radio resource control (RRC) connection signaling,
        forward link statistics, and
        reverse link statistics,
    wherein according to a second information collecting mode of the at least two information collecting modes, tracing information is collected for operations by the slave processor relating to:
        monitoring network conditions, and
        receiving paging messages,
    wherein information relating to radio resource control (RRC) connection signaling, forward link statistics, and reverse link statistics is not collected according to the second information collecting mode.

* * * * *